United States Patent
Bray

(10) Patent No.: US 12,005,750 B2
(45) Date of Patent: Jun. 11, 2024

(54) DETACHABLE PLUG

(71) Applicant: Fred Bray, Fulshear, TX (US)

(72) Inventor: Fred Bray, Fulshear, TX (US)

(*) Notice: Subject to any disclaimer, the term of this patent is extended or adjusted under 35 U.S.C. 154(b) by 147 days.

(21) Appl. No.: 17/521,946

(22) Filed: Nov. 9, 2021

(65) Prior Publication Data

US 2023/0142655 A1 May 11, 2023

(51) Int. Cl.
*B60D 1/62* (2006.01)
*H01R 13/502* (2006.01)
*H01R 13/639* (2006.01)

(52) U.S. Cl.
CPC ............ *B60D 1/62* (2013.01); *H01R 13/502* (2013.01); *H01R 13/639* (2013.01); *H01R 2201/26* (2013.01)

(58) Field of Classification Search
CPC .......... B60D 1/62; B60D 1/64; H01R 13/502; H01R 13/639; H01R 2201/26; H01R 13/60
USPC .......................................................... 439/35
See application file for complete search history.

(56) References Cited

U.S. PATENT DOCUMENTS

| | | | | |
|---|---|---|---|---|
| 4,109,989 A * | 8/1978 | Snyder, Jr. | ......... | H01R 13/5221 439/140 |
| 4,411,491 A * | 10/1983 | Larkin | ................. | H01R 13/523 385/59 |
| 4,624,472 A * | 11/1986 | Stuart | ...................... | B60D 1/62 439/701 |
| 4,738,641 A * | 4/1988 | Eversole, Jr. | .......... | H01R 13/60 248/314 |
| 5,863,221 A * | 1/1999 | Castaldo | ............ | H01R 13/5213 439/589 |
| 6,007,362 A * | 12/1999 | Davis | ................. | H01R 13/6456 439/680 |
| 6,222,443 B1 * | 4/2001 | Beeson | ..................... | B60D 1/62 340/539.1 |
| 6,749,438 B1 * | 6/2004 | Scheller | ................. | H01R 27/02 439/639 |
| 7,291,017 B1 * | 11/2007 | Fain | ......................... | B60D 1/64 439/35 |
| 7,575,450 B2 * | 8/2009 | Williams | ........... | H01R 13/5219 439/144 |
| 7,850,191 B1 * | 12/2010 | Kaminski | ................ | B60D 1/64 439/35 |
| 9,227,520 B2 * | 1/2016 | Kimura | .................... | B60L 53/16 |
| 9,300,080 B2 * | 3/2016 | Puluc | ..................... | H01R 13/625 |
| 9,444,207 B1 * | 9/2016 | Smith | .................... | H01R 27/02 |
| 2011/0318951 A1 * | 12/2011 | Armacost | ............ | H01R 13/745 29/525.08 |
| 2013/0001924 A1 * | 1/2013 | Adamczyk | ............. | B60D 1/065 280/511 |

(Continued)

*Primary Examiner* — Alexander Gilman
(74) *Attorney, Agent, or Firm* — The Iwashko Law Firm, PLLC; Lev Ivan Gabriel Iwashko

(57) ABSTRACT

A detachable plug, including a main body, including a first section, and a second section detachably connected to at least a portion of the first section to detach from the first section in response to an application of force exceeding a predetermined level of separation force, a first connector disposed on at least a portion of the first section to removably connect to at least a portion of a motor vehicle, and a second connector disposed on at least a portion of the second section to removably connect to at least a portion of a trailer.

6 Claims, 2 Drawing Sheets

(56) References Cited

U.S. PATENT DOCUMENTS

| | | | |
|---|---|---|---|
| 2015/0064936 A1* | 3/2015 | Bartoli | H01R 31/06 |
| | | | 439/35 |
| 2018/0323537 A1* | 11/2018 | Ma | B60K 37/00 |
| 2018/0364738 A1* | 12/2018 | Bridges | G05D 1/0217 |
| 2019/0302764 A1* | 10/2019 | Smith | B62D 53/125 |
| 2021/0138857 A1* | 5/2021 | Koenig | B60D 1/64 |
| 2023/0142655 A1* | 5/2023 | Bray | B60D 1/62 |
| | | | 439/35 |

* cited by examiner

DETACHABLE PLUG

BACKGROUND

1. Field

The present general inventive concept relates generally to a plug, and particularly, to a detachable plug.

2. Description of the Related Art

Trailers are unpowered vehicles that are often connected to a motor vehicle. An owner of a trailer usually has to manage an amount of cargo stored in the trailer to ensure successful transportation of the trailer. However, trailer management can lead to frequent errors where wires connected to the trailer and the motor vehicle are pulled and damaged. As a result, the damage to the trailer wires are expensive to repair.

The wires that connect the trailer to the motor vehicle are fixed. In other words, in the event the trailer separates from the motor vehicle, the wires are damaged.

Therefore, there is a need for a detachable plug to prevent damage to the wires in the event of a trailer separation.

SUMMARY

The present general inventive concept provides a detachable plug.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a detachable plug, including a main body, including a first section, and a second section detachably connected to at least a portion of the first section to detach from the first section in response to an application of force exceeding a predetermined level of separation force, a first connector disposed on at least a portion of the first section to removably connect to at least a portion of a motor vehicle, and a second connector disposed on at least a portion of the second section to removably connect to at least a portion of a trailer.

The main body may further include a locking clip springingly disposed on at least a portion of at least one of the first section and the second section to lock the first section to the second section in response to moving the locking clip from extended away from the first section and the second section in a first position to at least partially retracted toward the first section and the second section in a second position, and unlock the first section from the second section in response to moving the locking clip from retracted toward the first section and the second section in the second position to extended away from the first section and the second section in the first position.

The detachable plug may further include a plurality of connecting wires disposed within at least a portion of at least one the first section and the second section to send power received by the first connector to the second connector.

The plurality of connecting wires may send power received by the first connector to the second connector in response to locking the locking clip, and prevent power from being sent from the first connector to the second connector while the locking clip remains unlocked.

The first connector may include a first body, and a male end disposed on at least a portion of the first body to removably connect to at least a portion of the motor vehicle.

The second connector may include a second body, and a female end disposed on at least a portion of the second body to removably connect to at least a portion of the trailer.

The second connector may further include a barrier pivotally disposed on at least a portion of the female end to move from closed over the female end in a first position to at least partially opened away from the female end in a second position, and move from opened away from the female end in the second position to closed over the female end in the first position.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
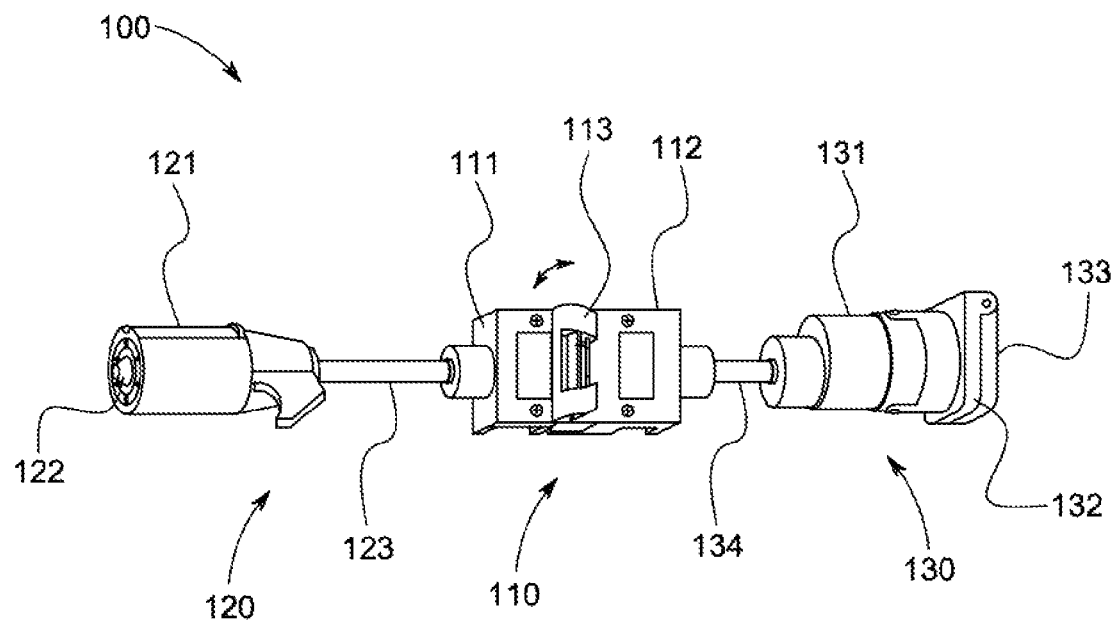
FIG. 1 illustrates a top perspective view of a detachable plug, according to an exemplary embodiment of the present general inventive concept.
Figure 1:
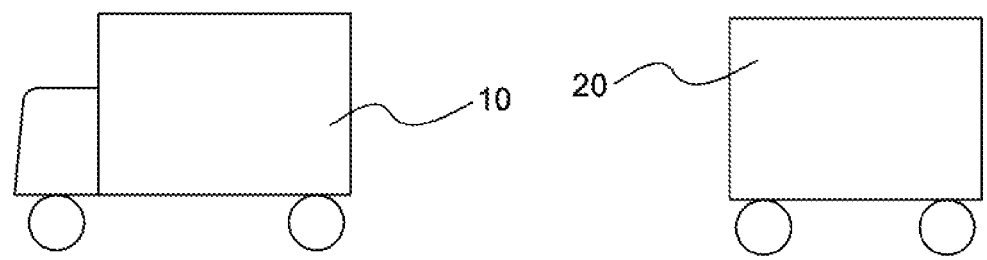

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Detachable Plug 100
Main Body 110
First Section 111
Second Section 112
Locking Clip 113
First Connector 120
First Body 121
Male End 122
First Connecting Wire 123
Second Connector 130
Second Body 131
Female End 132
Barrier 133
Second Connecting Wire 134
Connector Wires 140
First Set 141
Second Set 142

FIG. 1 illustrates a top perspective view of a detachable plug 100, according to an exemplary embodiment of the present general inventive concept.

Figure 2:
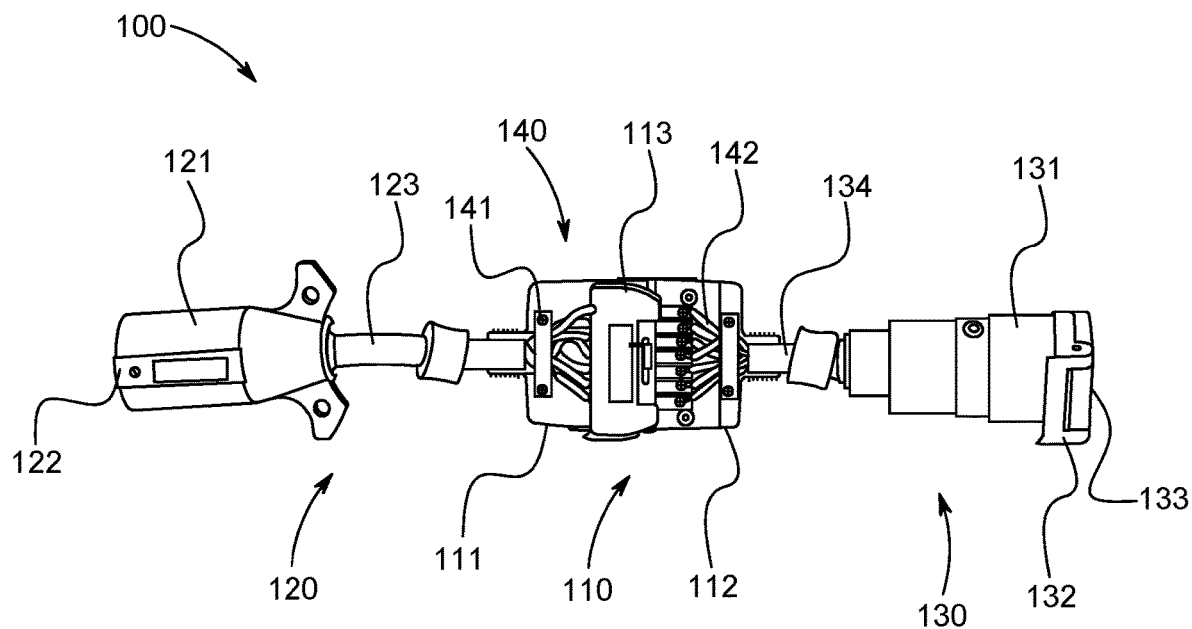
FIG. 2 illustrates a top perspective view of the detachable plug with a sectional view of a main body, according to an exemplary embodiment of the present general inventive concept.

FIG. 2 illustrates a top perspective view of the detachable plug 100 with a sectional view of a main body 110, according to an exemplary embodiment of the present general inventive concept.

The detachable plug 100 may be constructed from at least one of metal, plastic, wood, and rubber, etc., but is not limited thereto.

The detachable plug 100 may include a main body 110, a first connector 120, a second connector 130, and a plurality of connector wires 140, but is not limited thereto.

Referring to FIGS. 1 and 2, the main body 110 is illustrated to have a rectangular prism shape. However, the main body 110 may be rectangular, circular, conical, triangular, pentagonal, hexagonal, heptagonal, octagonal, or any other shape known to one of ordinary skill in the art, but is not limited thereto.

The main body 110 may include a first section 111, a second section 112, and a locking clip 113, but is not limited thereto.

The first section 111 may be removably connected to at least a portion of a motor vehicle 10.

The second section 112 may be removably connected to at least a portion of a trailer 20. Moreover, the second section 112 may be detachably connected to at least a portion of the first section 111. More specifically, the first section 111 and/or the second section 112 may detachably connect using a magnet, an electromagnet, a plurality of hooks, and/or any other type of fastener, but is not limited thereto.

Furthermore, the first section 111 and/or the second section 112 may detach from each other in response to an application of force (e.g., pushing, pull) against the first section 111 and/or the second section 112 away from each other. Additionally, the first section 111 and/or the second section 112 may detach only in response to the application of force exceeding a predetermined level of separation force (e.g., five hundred pounds, one thousand pounds, two thousand pounds, etc.). For example, the first section 111 and/or the second section 112 may remain connected in response to a person and/or a plurality of persons attempting to separate the first section 111 and/or the second section 112. However, the first section 111 and/or the second section 112 may detach in response to the motor vehicle 10 moving away from and/or separating from the trailer 20, such that the application of force of the motor vehicle 10 moving away from the trailer 20 is substantially greater than the application of force from the person.

The locking clip 113 may be springingly and/or pivotally (i.e., rotatably) disposed on at least a portion of the first section 111 and/or the second section 112. The locking clip 113 may lock the first section 111 to the second section 112 in response to moving the locking clip 113 from extended away from the first section 111 and/or the second section 112 in a first position to at least partially retracted toward the first section 111 and/or the second section 112 in a second position. Conversely, the locking clip 113 may unlock the first section 111 from the second section 112 in response to moving the locking clip 113 from retracted toward the first section 111 and/or the second section 112 in the second position to extended away from the first section 111 and/or the second section 112 in the first position. Also, the locking clip 113 may be spring biased to the unlocked position. As such, the locking clip 113 may secure the first section 111 to the second section 112. For example, the locking clip 113 may connect the magnet on the first section 111 to the magnet on the second section 112, and/or the plurality of hooks on the first section 111 to the plurality of hooks on the second section 112.

It is important to note that the locking clip 113 does not prevent separation of the first section 111 from the second section 112 in response to the application of force exceeding the predetermined level of separation force.

The first connector 120 may be constructed as a seven-pin male end.

However, any number of pins may be used as required by the motor vehicle 10 and/or the trailer 20.

The first connector 120 may include a first body 121, a male end 122, and a first connecting wire 123, but is not limited thereto.

Referring again to FIGS. 1 and 2, the first body 121 is illustrated to have a cylindrical shape. However, the first body 121 may be rectangular, circular, conical, triangular, pentagonal, hexagonal, heptagonal, octagonal, or any other shape known to one of ordinary skill in the art, but is not limited thereto.

The first body 121 may be disposed on at least a portion of the first section 111.

The male end 122 may be disposed on at least a portion of a first end of the first body 121. The male end 122 may be removably connected (i.e., inserted) into at least a portion of at least one first connector. For example, the male end 122 may be removably connected to at least a portion of the at least one first connector of the motor vehicle 10.

The first connecting wire 123 may be disposed on at least a portion of a second end of the first body 121 opposite with respect to the first end. Moreover, the first connecting wire 123 may connect the first body 121 to the first section 111.

The second connector 130 may be constructed as a seven-pin female end.

However, any number of pins may be used as required by the motor vehicle 10 and/or the trailer 20.

The second connector 130 may include a second body 131, a female end 132, a barrier 133, and a second connecting wire 134, but is not limited thereto.

Referring again to FIGS. 1 and 2, the second body 131 is illustrated to have a cylindrical shape. However, the second body 131 may be rectangular, circular, conical, triangular, pentagonal, hexagonal, heptagonal, octagonal, or any other shape known to one of ordinary skill in the art, but is not limited thereto.

The second body 131 may be disposed on at least a portion of the second section 112.

The female end 132 may be disposed on at least a portion of a first end of the second body 131. The female end 132 may be removably connected to at least a portion of at least one second connector. For example, the female end 132 may be removably connected to at least a portion of the at least one second connector of the trailer 20.

The barrier 133 may be springingly and/or pivotally (i.e., rotatably) disposed on at least a portion of the female end 132. In particular, the barrier 133 may move from closed over the female end 132 in a first position to at least partially opened away from the female end 132 in a second position. Conversely, the barrier 133 may move from opened away from the female end 132 in the second position to closed over the female end 132 in the first position. In other words, the barrier 133 may cover and/or prevent access to the female end 132 while closed, and allow access to the female end 132 while opened.

The second connecting wire 134 may be disposed on at least a portion of a second end of the second body 131 opposite with respect to the first end. Moreover, the second connecting wire 134 may connect the second body 131 to the second section 112.

The plurality of connector wires 140 may include a first set 141 and a second set 142, but is not limited thereto.

The first set 141 may be disposed within at least a portion of the first section 111. The first set 141 may connect, separate, and/or organize the first connecting wire 123 to pins on the first section 111.

The second set 142 may be disposed within at least a portion of the second section 112. The second set 142 may connect, separate, and/or organize the second connecting wire 134 to pins on the second section 112. Moreover, each wire of the first set 141 may connect to each wire of the second set 142. In other words, each wire of the first set 141 may connect to each corresponding and/or equivalent wire of the second set 142. Accordingly, the first connector 120 may receive power from the motor vehicle 10 and transfer power through the plurality of connector wires 140 to the second connector 130, such that the second connector 130 may provide power to the trailer 20.

Furthermore, the second set 142 may connect to the first set 141 in response to locking the locking clip 113. Thus, the second set 142 may remain separate from the first set 141 while the locking clip 113 is unlocked. In other words, the locking clip 113 may prevent power from being sent from the first set 141 to the second set 142 while the locking clip 113 remains unlocked.

Therefore, the detachable plug 100 may prevent damage to the first connector 120 and/or the second connector 130 in the event of separation of the motor vehicle 10 from the trailer 20. As such, the detachable plug 100 may save time and costs for repair that would otherwise result from torn wires. The detachable plug 100 may accommodate a wide variety of hitch connections and different combinations of the motor vehicle 10 and the trailer 20.

The present general inventive concept may include a detachable plug 100, including a main body 110, including a first section 111, and a second section 112 detachably connected to at least a portion of the first section 111 to detach from the first section 111 in response to an application of force exceeding a predetermined level of separation force, a first connector 120 disposed on at least a portion of the first section 111 to removably connect to at least a portion of a motor vehicle 10, and a second connector 130 disposed on at least a portion of the second section 112 to removably connect to at least a portion of a trailer 20.

The main body 110 may further include a locking clip 113 springingly disposed on at least a portion of at least one of the first section 111 and the second section 112 to lock the first section 111 to the second section 112 in response to moving the locking clip 113 from extended away from the first section 111 and the second section 112 in a first position to at least partially retracted toward the first section 111 and the second section 112 in a second position, and unlock the first section 111 from the second section 112 in response to moving the locking clip 113 from retracted toward the first section 111 and the second section 112 in the second position to extended away from the first section 111 and the second section 112 in the first position.

The detachable plug 100 may further include a plurality of connecting wires 140 disposed within at least a portion of at least one the first section 111 and the second section 112 to send power received by the first connector 120 to the second connector 130.

The plurality of connecting wires 140 may send power received by the first connector 120 to the second connector 130 in response to locking the locking clip 113, and prevent power from being sent from the first connector 120 to the second connector 130 while the locking clip 113 remains unlocked.

The first connector 120 may include a first body 121, and a male end 122 disposed on at least a portion of the first body 121 to removably connect to at least a portion of the motor vehicle 10.

The second connector 130 may include a second body 131, and a female end 132 disposed on at least a portion of the second body 131 to removably connect to at least a portion of the trailer 20.

The second connector 130 may further include a barrier 134 pivotally disposed on at least a portion of the female end 132 to move from closed over the female end 132 in a first position to at least partially opened away from the female end 132 in a second position, and move from opened away from the female end 132 in the second position to closed over the female end 132 in the first position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A detachable plug, comprising:
   a main body, comprising:
      a first section, and
      a second section detachably connected to at least a portion of the first section to detach from the first section in response to an application of force exceeding a predetermined level of separation force, wherein the application of force is provided in a first direction toward the first section that is linearly parallel and opposite to a second direction toward the second section;

a first connector disposed on at least a portion of the first section to removably connect to at least a portion of a motor vehicle;

a second connector disposed on at least a portion of the second section to removably connect to at least a portion of a trailer; and a locking clip springingly disposed on at least a portion of at least one of the first section and the second section to lock the first section to the second section in response to moving the locking clip from extended away from the first section and the second section in a first position to at least partially retracted toward the first section and the second section in a second position, and unlock the first section from the second section in response to moving the locking clip from retracted toward the first section and the second section in the second position to extended away from the first section and the second section in the first position, wherein the locking clip is unlocked in response to the application of force.

2. The detachable plug of claim 1, further comprising:

a plurality of connecting wires disposed within at least a portion of at least one the first section and the second section to send power received by the first connector to the second connector.

3. The detachable plug of claim 2, wherein the plurality of connecting wires send power received by the first connector to the second connector in response to locking the locking clip, and prevent power from being sent from the first connector to the second connector while the locking clip remains unlocked.

4. The detachable plug of claim 1, wherein the first connector comprises: a first body; and a male end disposed on at least a portion of the first body to removably connect to at least a portion of the motor vehicle.

5. The detachable plug of claim 1, wherein the second connector comprises: a second body; and a female end disposed on at least a portion of the second body to removably connect to at least a portion of the trailer.

6. The detachable plug of claim 5, wherein the second connector further comprises:

a barrier pivotally disposed on at least a portion of the female end to move from closed over the female end in a first position to at least partially opened away from the female end in a second position, and move from opened away from the female end in the second position to closed over the female end in the first position.

* * * * *